(12) United States Patent
Takakura et al.

(10) Patent No.: US 11,996,214 B2
(45) Date of Patent: May 28, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Ryuta Takakura, Mie (JP); Housei Mizuno, Mie (JP); Daisuke Ebata, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 733 days.

(21) Appl. No.: 17/058,717

(22) PCT Filed: Feb. 25, 2019

(86) PCT No.: PCT/JP2019/007010
§ 371 (c)(1),
(2) Date: Nov. 25, 2020

(87) PCT Pub. No.: WO2019/230080
PCT Pub. Date: Dec. 5, 2019

(65) Prior Publication Data
US 2021/0151218 A1    May 20, 2021

(30) Foreign Application Priority Data
May 30, 2018    (JP) .................. 2018-103549

(51) Int. Cl.
*H01B 7/08*      (2006.01)
*G02B 6/36*      (2006.01)
(Continued)

(52) U.S. Cl.
CPC .......... *H01B 7/0846* (2013.01); *G02B 6/3628* (2013.01); *H01B 7/292* (2013.01); *B60R 16/0215* (2013.01)

(58) Field of Classification Search
CPC ...... H01B 7/0846; H01B 7/292; G02B 6/3628
See application file for complete search history.

(56) References Cited

U.S. PATENT DOCUMENTS

| 10,409,017 B2 * | 9/2019 | Chiasson ............. G02B 6/4411 |
| 2015/0050525 A1 | 2/2015 | Ahn |
| 2020/0307475 A1 | 10/2020 | Yamamoto et al. |

FOREIGN PATENT DOCUMENTS

| CN | 111247030 | 6/2020 |
| JP | 61-147718 | 7/1986 |

(Continued)

OTHER PUBLICATIONS

International Search Report (ISR) issued in International Patent Application No. PCT/JP2019/007010, dated Mar. 19, 2019, together with English translation thereof.
(Continued)

*Primary Examiner* — Sung H Pak
(74) *Attorney, Agent, or Firm* — GREENBLUM & BERNSTEIN, P.L.C.

(57) ABSTRACT

A wiring member includes a flat wiring body and a protection sheet material partially fixed to at least one main surface of the wiring body in a plurality of positions at intervals. For example, it is considered that the wiring body includes a sheet-like base material and a plurality of wire-like transmission members disposed on one main surface of the base material, and the protection sheet material is partially fixed to the other main surface of the base material.

9 Claims, 3 Drawing Sheets

(51) Int. Cl.
  *H01B 7/29*     (2006.01)
  *B60R 16/02*    (2006.01)

(56)         References Cited

FOREIGN PATENT DOCUMENTS

| JP | 2000-100255 | 4/2000 |
| JP | 2005-214177 | 8/2005 |
| JP | 2009-23030  | 2/2009 |
| JP | 2014-143861 | 8/2014 |
| JP | 2015-37072  | 2/2015 |
| JP | 2015-067072 | 4/2015 |
| JP | 2016-013051 | 1/2016 |
| JP | 2016-019292 | 2/2016 |
| JP | 2016-134958 | 7/2016 |
| JP | 2016-157757 | 9/2016 |
| JP | 2017-63573  | 3/2017 |
| JP | 2017-63576  | 3/2017 |

OTHER PUBLICATIONS

International Preliminary Report on Patentability (IPRP) issued in International Patent Application No. PCT/JP2019/007010, dated Dec. 11, 2019, together with English translation thereof.
China Office Action issued in China Patent Application No. 2019800344698, dated Aug. 4, 2021, together with English translation thereof.
Japan Office Action issued in Japan Patent Application No. 2019-154955, dated May 24,2022, together with English translation thereof.

* cited by examiner

WIRING MEMBER

TECHNICAL FIELD

The present disclosure relates to a wiring member.

BACKGROUND ART

Patent Document 1 discloses a technique of wrapping an electrical wire bundle made up of a plurality of electrical wires bundled into a round shape in cross section by a protection sheet material to protect the electrical wires mounted to a vehicle.

PRIOR ART DOCUMENTS

Patent Documents

Patent Document 1: Japanese Patent Application Laid-Open No. 2016-19292

SUMMARY

Problem to be Solved by the Invention

A flat wiring body is mounted to a vehicle as a wiring member in addition to the electrical wire bundle in some cases. When such a flat wiring body is protected by a protection sheet material, it is difficult to apply a technique of protecting an electrical wire bundle having round shape in cross section by the protection sheet material described in the above Patent Document 1.

An object of the present invention is to provide a technique appropriate for a protection of a flat wiring member by a protection sheet material.

Means to Solve the Problem

A wiring member according to the present disclosure includes a flat wiring body and a protection sheet material partially fixed to at least one main surface of the wiring body in a plurality of positions at intervals.

Effects of the Invention

The present disclosure is appropriate for a protection of a flat wiring member by a protection sheet material.

DESCRIPTION OF EMBODIMENT(S)

[Description of Embodiment of Present Disclosure]

Embodiments of the present disclosure are listed and described firstly.

A wiring member according to the present disclosure is as follows.

(1) A wiring member according to the present disclosure includes a flat wiring body and a protection sheet material partially fixed to at least one main surface of the wiring body in a plurality of positions at intervals.

The wiring member includes the protection sheet material partially fixed to at least one main surface of the wiring body in the plurality of positions at intervals, thus when the a part of the wiring member provided with the protection sheet material scrapes against a burr, for example, the protection sheet material and the wiring body can relatively move. Accordingly, the burr hardly reaches the wiring body, and a damage to the wiring body can be suppressed. Accordingly, protection properties by the protection sheet material can be improved, thus the present disclosure can be considered a technique appropriate for the protection of the flat wiring member by the protection sheet material.

(2) It is preferable that the wiring body includes a sheet-like base material and a plurality of wire-like transmission members disposed on one main surface of the base material, and the protection sheet material is partially fixed to the other main surface of the base material. The reason is that the flat wiring body can be formed using a general-purpose wire-like transmission member.

(3) The protection sheet material preferably has a heat insulation function. The reason is that the protection sheet material can have the heat insulation function in addition to the protection function.

[Details of Embodiment of Present Disclosure]

Specific examples of a wiring member of the present disclosure are described hereinafter with reference to the drawings. The present invention is not limited to these examples, but is indicated by claims, and it is intended that meanings equivalent to claims and all modifications within a scope of claims are included.

[Embodiment]

Figure 1:
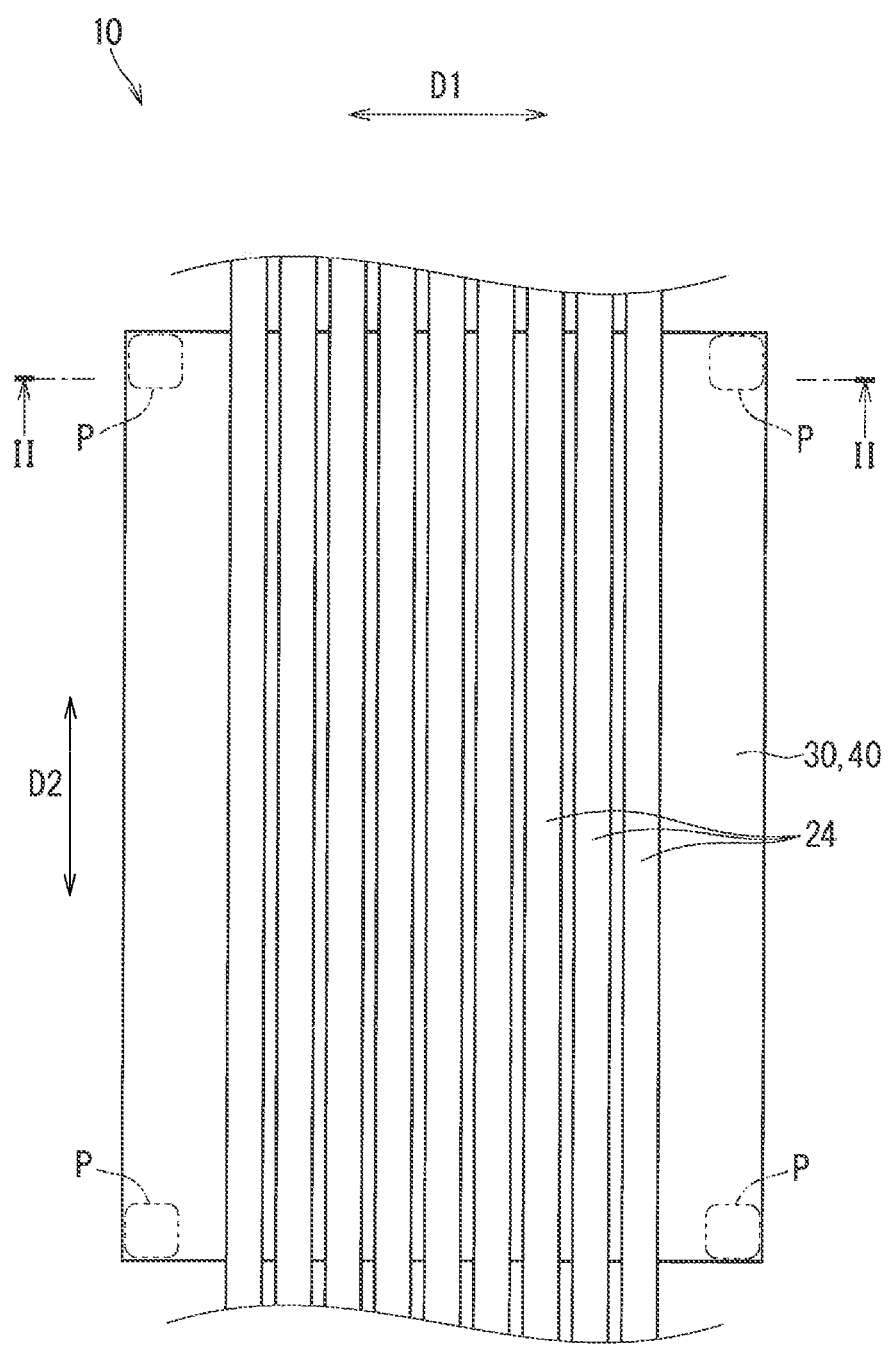
FIG. 1 is a schematic plan view illustrating a wiring member according to an embodiment.
Figure 2:
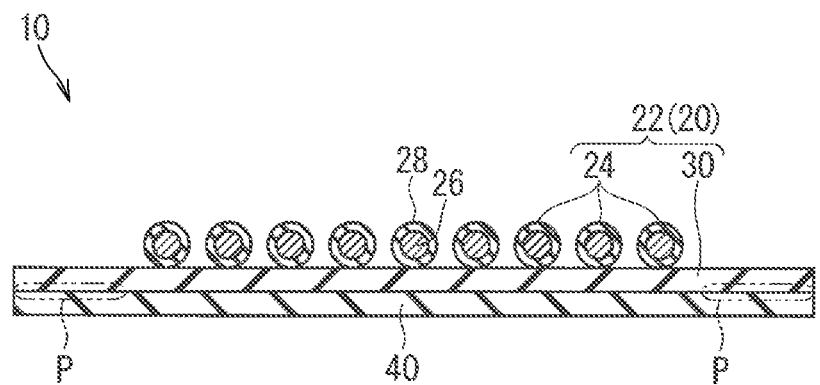
FIG. 2 is a cross-sectional view of the wiring member cut along a II-II line in FIG. 1.

A wiring member according to an embodiment is described hereinafter. FIG. 1 is a schematic plan view illustrating a wiring member 10 according to the embodiment. FIG. 2 is a cross-sectional view of the wiring member cut along a II-II line in FIG. 1.

The wiring member 10 is a member joined to a component mounted to a vehicle to transmit electrical power or light regarding the component. The wiring member 10 includes a wiring body 20 and a protection sheet material 40.

The wiring body 20 is a member joined to a component mounted to a vehicle to transmit electrical power or light regarding the component. Accordingly, the wiring body 20 includes a transmission member transmitting electrical power or light. The wiring member 10 is flatly formed. In the description hereinafter, the wiring body 20 is a base material-attached wiring body 22. The base material-attached wiring body 22 includes a plurality of wire-like transmission members 24 and a sheet-like base material 30.

It is sufficient that the wire-like transmission member 24 is a wire-like member transmitting electrical power or light. For example, the wire-like transmission member 24 may be a general wire having a core wire and a covering around the core wire, or may also be a bare conductive wire, a shielded wire, an enamel wire, a nichrome wire, or an optical fiber. The wire-like transmission member 24 transmitting the electrical power may be various kinds of signal wires or various kinds of power wires.

Herein, the wire-like transmission member 24 includes a transmission wire body transmitting electrical power or light and a sheath covering the transmission wire body. In the description hereinafter, the wire-like transmission member 24 is a general wire 24 (simply referred to as the electrical wire 24 hereinafter). That is to say, the electrical wire 24 includes a core wire 26 as the transmission wire body and an insulating covering 28 as the sheath covering the transmission wire body.

The core wire 26 is made up of one or a plurality of strands. The strand is formed of a conductor made of copper, copper alloy, aluminum, or aluminum alloy, for example. When the core wire 26 is made up of the plurality of strands, the plurality of strands are preferably stranded. The insulating covering 28 is formed of a resin material such as polyvinyl chloride (PVC) or polyethylene (PE) extrusion-molded around the core wire 26. Herein, the electrical wire 24 is a so-called round wire having a round shape in cross section.

The plurality of electrical wires 24 are disposed on one main surface of the sheet-like base material 30. A route of the electrical wire 24 on the base material 30 may be appropriately set. In the example illustrated in FIG. 1, the electrical wire 24 is linearly disposed on the base material 30, but may be bended and disposed, or may be disposed to have both a linear part and a bended part. In the example illustrated in FIG. 1, the plurality of electrical wires 24 are parallelly disposed on the base material 30, however, at least some of the plurality of electrical wires 24 may extends along a different route.

A connector, for example, provided on an end portion of the electrical wire 24 is connected to a partner connector provided on a component to which the wiring member 10 is connected. The connector is formed by housing the end portion of the electrical wire 24 in an electrical wire housing part of a housing. In the example illustrated in FIG. 1, the end portion of the electrical wire 24 extends to an outer side of the base material 30, however, the end portion of the electrical wire 24 may be located on the base material 30. In this case, the housing may be or may not be directly fixed to the base material 30.

The sheet-like base material 30 keeps the plurality of electrical wires 24 in a flat state. Herein, the electrical wire 24 is disposed on the base material 30. The electrical wire 24 and the base material 30 are fixed to each other. Applicable as the above fixing state are a contact area fixation and a non-contact area fixation, or both fixations may be used together. Herein, the contact area fixation indicates that a portion where the electrical wire 24 and the base material 30 have contact with each other is stuck and fixed. The non-contact area fixation is a fixing state which is not the contact area fixation, and indicates that a sewing thread, the other sheet material, or an adhesive tape presses the electrical wire 24 toward the base material 30 or sandwiches the electrical wire 24 and the base material 30 to keep them in a fixing state. In the description hereinafter, the electrical wire 24 and the base material 30 are in the state of the contact area fixation.

Applicable as the configuration of the contact area fixation are a contact area indirect fixation and a contact area direct fixation, or both fixations may also be used together in different regions. Herein, the contact area indirect fixation indicates that the electrical wire 24 and the base material 30 are indirectly stuck and fixed via an adhesive agent, a gluing agent, and a double-sided adhesive tape provided therebetween. The contact area direct fixation indicates that the electrical wire 24 and the base material 30 are directly stuck and fixed without an intervention of the adhesive agent, for example, which is separately provided. Considered in the contact area direct fixation is that resin included in at least one of the electrical wire 24 and the base material 30 is melted, thus the electrical wire 30 and the base material 30 are stuck and fixed, for example. In the description hereinafter, the electrical wire 24 and the base material 30 are in the state of the contact area direct fixation.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the electrical wire 24 and the base material 30 are in the state of the contact area direct fixation by these means. Specifically, when the state of the contact area direct fixation is formed by the ultrasonic welding, for example, the electrical wire 24 and the base material 30 are in the state of the contact area direct fixation by the ultrasonic welding.

In the case of the contact area direct fixation, only one of the resin included in the insulating covering 28 of the electrical wire 24 and the resin included in the base material 30 may be melted, or both of them may be melted. In the former case, the resin which has been melted is stuck on an outer surface of the resin which has not been melted, and a relatively clear interface may be formed in some cases. In the latter case, there may be a case where both the resins are mixed and a clear interface is not be formed. Particularly, when the insulating covering 28 of the electrical wire 24 and the base material 30 include compatible resin such as the same resin material, for example, there may be a case where both the resins are mixed and a clear interface is not be formed.

The protection sheet material 40 is partially fixed to at least one main surface of the wiring body 20 in a plurality of positions at intervals. Herein, the protection sheet material 40 is partially fixed to the other main surface of the base material 30.

In the example illustrated in FIG. 1, the base material 30 and the protection sheet material 40 are formed to have a quadrangular shape, however, shapes of the base material 30 and the protection sheet material 40 are not limited thereto. The base material 30 may be formed to have a shape corresponding to an arrangement route of the electrical wire 24, for example. A part where the electrical wire 24 is not disposed can be appropriately omitted.

The base material 30 and the protection sheet material 40 are formed into the same shape, but may be formed into different shapes. That is to say, the protection sheet material 40 and the base material 30 may partially include a part not overlapped with each other. At this time, the protection sheet material 40 may be provided on a part of the base material 30, or the base material 30 may be provided on a part of the protection sheet material 40.

The base material 30 and the protection sheet material 40 are partially fixed to each other in a plurality of positions at intervals in a first direction D1. Furthermore, the base material 30 and the protection sheet material 40 are partially fixed to each other in a plurality of positions at intervals in a second direction D2 intersecting with the first direction D1.

FIG. 1 illustrates a fixing position P of the base material 30 and the protection sheet material 40 by a virtual line. As illustrated in FIG. 1, four corners of the base material 30 and the protection sheet material 40 formed into the quadrangular shape and overlapped with each other are fixed. Accordingly, in the example illustrated in FIG. 1, the base material 30 and the protection sheet material 40 are partially fixed to each other in the plurality of positions at intervals in the first direction D1 along a first edge portion of the base material 30 and the protection sheet material 40. The base material 30 and the protection sheet material 40 are partially fixed to each other in the plurality of positions at intervals in the second direction D2 along a second edge portion of the base material 30 and the protection sheet material 40. The first direction D1 is a direction in which the plurality of electrical wires 24 are arranged in the example illustrated in FIG. 1. The second direction D2 is a longitudinal direction of the electrical wire 24 in the example illustrated in FIG. 1. Obviously, the first direction D1 and the second direction D2 are also considered directions other than those described above.

The base material 30 and the protection sheet material 40 are fixed in two positions at an interval along the first direction, but may also be fixed in three or more positions at intervals along the first direction. Similarly, the base material 30 and the protection sheet material 40 are fixed in two positions at an interval along the second direction, but may also be fixed in three or more positions at intervals along the second direction.

Welding is adopted herein as a means of fixing the base material 30 and the protection sheet material 40. That is to say, at least one of the base material 30 and the protection sheet material 40 has a resin material, and the resin material is melted to be joined to the other element.

The welding means is not particularly limited, however, adoptable are various welding means such as ultrasonic welding, heating and pressurizing welding, hot-air welding, and high-frequency welding. The means of welding the electrical wire 24 and the base material 30 may be the same as or different from the means of welding the base material 30 and the protection sheet material 40.

A material constituting the base material 30 and the protection sheet material 40 is not particularly limited. The material constituting the base material 30 and the protection sheet material 40 may include resin such as PVC, PE, polyethylene terephthalate (PET), or polypropylene (PP), for example, or may include metal such as aluminum or copper.

The material of the base material 30 may be the same as or different from the material of the protection sheet material 40.

The base material 30 and the protection sheet material 40 may be made of a material having fiber such as a woven cloth, a knitted cloth, or a non-woven cloth, for example, or may not have fiber but be bonded and formed by extrusion molding or injection molding. In the latter case, the base material 30 and the protection sheet material 40 may be a foam formed by foam molding, or may be molded to have a solid cross section instead of the foam molding.

The base material 30 and the protection sheet material 40 may have a single layer structure or a multilayer structure. When the base material 30 and the protection sheet material 40 have the multilayer structure, it is considered that a resin layer and a resin layer are stacked, for example. It is also considered that a resin layer and a metal layer are stacked, for example. When the base material 30 is made by stacking the resin layer and the resin layer, layers with fiber or layers with no fiber may be overlapped with each other, or a layer with fiber and a layer with no fiber may be overlapped each other.

When the base material 30 and the protection sheet material have the multilayer structure, the base material 30 and the protection sheet material 40 may be molded by bonding sheet-like members which have been separately molded, or may be molded by single extrusion molding or injection molding.

The structure of the base material 30 may be the same as or different from the structure of the protection sheet material 40.

It is sufficient that the base material 30 is formed to be appropriate for the fixation (welding herein) of the electrical wire 24. More specifically, it is sufficient that the material of the part of the base material 30 to which the electrical wire 24 is fixed is set in accordance with a fixing means of fixing the base material 30 and the electrical wire 24. For example, when the base material 30 and the insulating covering 28 of the electrical wire 24 are welded, the part of the base material 30 to which the electrical wire 24 is fixed preferably includes a resin, and it is more preferable that the part of the base material 30 to which the electrical wire 24 is fixed and the insulating covering 28 of the electrical wire 24 include the same resin. Accordingly, both the insulating covering 28 of the electrical wire 24 and the resin base material 30 are incited and mutually joined, thus welding intensity can be increased.

In the meanwhile, it is sufficient that the protection sheet material 40 is formed to have higher protection properties than the base material 30, Considered as such a combination of the base material 30 and the protection sheet material 40, for example, is that the base material 30 is made of a material of PVC and formed to have a filled cross section by extrusion molding, and the protection sheet material 40 is a non-woven cloth made of a material of PET.

It is sufficient that the wiring member 10 has flexibility. Accordingly, when the wiring member 10 is disposed, the wiring member 10 can be disposed in a bended state. For example, the base material 30 and the protection sheet material 40 have flexibility. At this time, even when the electrical wire 24 is disposed on the base material 30, the electrical wire 24 does not interfere with the flexibility of the base material 30 and the protection sheet material 40. Accordingly, the wiring member 10 can have flexibility. However, the wiring member 10 may not have flexibility.

<Motion>

Figure 3:
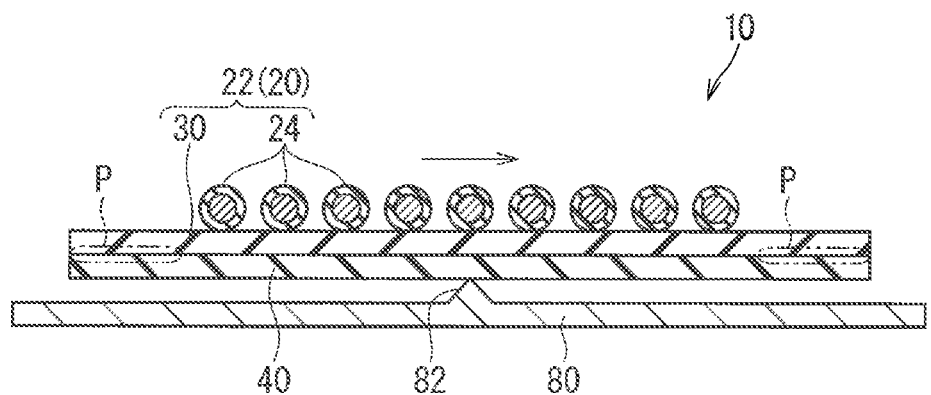
FIG. 3 is a drawing for describing a motion when the wiring member is caught on a burr.
Figure 4:
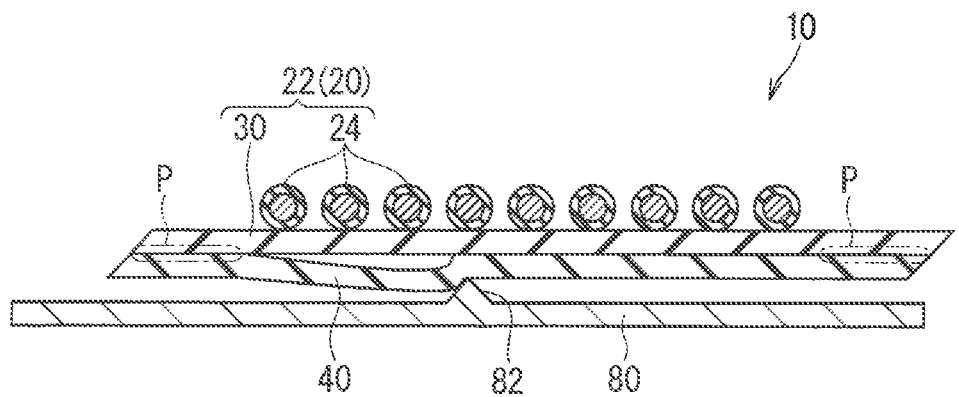
FIG. 4 is a drawing for describing a motion when the wiring member is caught on a burr.

A motion of the wiring member 10 caught on a burr is described with reference to FIG. 3 and FIG. 4. FIG. 3 and FIG. 4 are explanation diagrams each illustrating a motion of the wiring member 10 caught on a burr 82.

For example, when the wiring member 10 is assembled to a vehicle, or when the wiring member 10 moves due to a vibration, for example, in a state of being assembled to the vehicle, there is a possibility that the wiring member 10 moves in relation to the burr 82 generated in a metal member 80 in a state where a part of the wiring member 10 is caught on the burr 82.

Considered at this time is a ease where the wiring member 10 moves in relation to the burr 82 in a state where a part of the wiring member 10 provided with the protection sheet material 40 is caught on the burr 82 as illustrated in FIG. 3. More specifically, considered is a case where the wiring member 10 moves in a direction connecting the fixing positions P in a state where the burr 82 is caught on a position of the protection sheet material 40 between the fixing positions P being fixed to the wiring body 20 at an interval. Considered in the example illustrated in FIG. 3 is a case where the wiring member 10 moves in the direction D1 in a state where the burr 82 is caught on a part of the protection sheet material 40 between the fixing positions P away from each other along the first direction D1.

Herein, the protection sheet material 40 is fixed to the wiring body 20 in the plurality of fixing positions P at intervals, thus the protection sheet material 40 and the wiring body 20 can relatively move in a direction connecting the plurality of fixing positions P away from each other at intervals. Thus, even in a state where an intermediate part of the protection sheet material 40 along the first direction D1 is caught on the burr 82, the wiring body 20 can move in the first direction D1 in relation to the burr 82 as illustrated in FIG. 4. Accordingly, the burr 82 hardly reaches the wiring body 20, and a damage to the wiring body 20 can be suppressed.

According to the wiring member 10 having the above configuration, when the a part of the wiring member 10 provided with the protection sheet material 40 scrapes against the burr 82, for example, the protection sheet material 40 and the wiring body 20 can relatively move. Accordingly, the burr 82 hardly reaches the wiring body 20, and a damage to the wiring body 20 can be suppressed. Accordingly, protection properties by the protection sheet material 40 can be improved, thus the present disclosure can be considered a technique appropriate for the protection of the flat wiring member 10 by the protection sheet material 40.

The wiring body 20 includes the sheet-like base material 30 and the plurality of electrical wires 24 disposed on one main surface of the base material 30, and the protection sheet material 40 is partially fixed to the other main surface of the base material 30, thus the flat wring body 20 can be formed easily using the general-purpose electrical wire 24.

Modification Example

The protection function of the protection sheet material 40 is mainly described above, however, it is also considered that the protection sheet material 40 has a function other than the protection function. For example, in a wiring member 110 according to a modification example illustrated in FIG. 5, a protection sheet material 140 has a heat insulation function. Herein, the heat insulation function indicates a function of reducing a thermal migration due to at least one of conduction, convection, and radiation.

For example, when a reflection layer of metal such as aluminum or white resin is provided on the other main surface (the main surface on a side opposite from a side of the wiring body 20) of the protection sheet material 140, a rate of reflecting electromagnetic wave increases, thus the thermal migration due to radiation can be suppressed. In this case, the reflection layer preferably has a high infrared reflectance.

For example, when the protection sheet material 140 has a foam resin layer, air bubbles formed in the foam resin layer can suppress the thermal migration due to conduction and convection. At this time, in order to increase a heat insulation effect, a size of the air bubbles formed in the foam resin layer is preferably small, and the number of the air bubbles is preferably large. When the large number of minute air bubbles are formed in the foam resin layer as is this preferable case, the foam resin layer is whitened. This whitened foam resin layer can also be used as the reflection layer described above.

It is also applicable that the reflection layer described above and a layer having low thermal conductivity are stacked to be provided on one protection sheet material 140, A transparent resin layer having high transmissivity may be formed on a side of an outer surface of the reflection layer.

A resin constituting the white resin layer to be the reflection layer and a resin constituting the foam resin layer to be a layer having low thermal conductivity are not particularly limited, however, various resin materials such as polybutylene terephthalate (PBT), for example, can be adopted.

Figure 5:
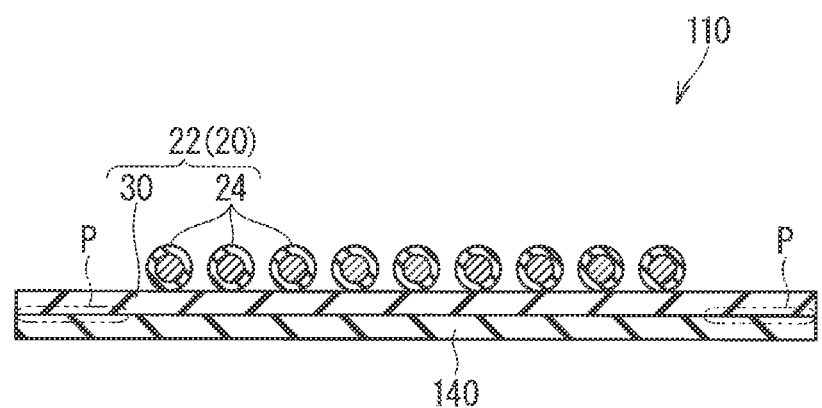
FIG. 5 is a schematic cross-sectional view illustrating a wiring member according to a modification example.

The wiring member 110 in which the protection sheet material 140 has the heat insulation function is disposed in a state where the other main surface of the protection sheet material 140 faces a thermal source 90 such as an exhaust manifold, for example, as illustrated in FIG. 5. Accordingly, the protection sheet material 140 interferes with a thermal migration from the thermal source 90 to the wiring body 20, thus the heat is hardly transferred to the wiring body 20.

The material and the structure of the protection sheet material 140 are changed in this manner, thus the protection sheet material 140 can also have a function such as the heat insulation function other than the protection function.

In the above description, the flat wiring body 20 is the base material-attached wiring body 22, however, this configuration is not necessary. The flat wiling body 20 may be a so-called flexible flat cable (FFC) in which a plurality of core wires 26 are collectively covered by one covering or a so-called flexible printed circuits (FPC) in which a circuit is formed in conductive foil attached to an insulating film as a base.

Also when the flat wiring body 20 is the base material-attached wire 22, the configuration thereof is not limited to that described above. With regard to the shape of the wire-like transmission member 24, for example, an outer shape of the wire-like transmission member 24 may be formed into a rectangular shape in cross section. In this case, an area of contact between the base material 30 and the wire-like transmission member 24 can be easily increased. The base material-attached wiring body 22 may include a cover covering the wire-like transmission member 24 from a side opposite to the base material 30 described above.

In the above description, the means of fixing the base material 30 and the protection sheet material 40 is welding, however, this configuration is not necessary. The base material 30 and the protection sheet material 40 may be joined by an adhesive agent or an adhesive tape, for example. The base material 30 may be sewn to the protection sheet material 40 by a sewing thread, for example. The base material 30 may be mechanically connected to the protection sheet material 40 by a banding band or a stapler, for example.

In the above description, the wiring body 20 and the protection sheet material 40 are fixed to each other at intervals in the plurality of directions including the first direction D1 and the second direction D2, however, this configuration is not necessary. For example, the wiring body 20 and the protection sheet material 40 may be fixed to each other at intervals only in the first direction D1. In this case, in the example illustrated in FIG. 1, for example, the part between the fixing positions P is sequentially fixed along the second direction D2. For example, the wiring body 20 and the protection sheet material 40 may be fixed to each other at intervals only in the second direction D2, In this case, in the example illustrated in FIG. 1, for example, the part between the fixing positions P is sequentially fixed along the first direction D1.

Each configuration described in the embodiment and each modification example can be appropriately combined as long as they are not contradictory.

EXPLANATION OF REFERENCE SIGNS 10, 110 wiring member
20 wiring body
22 base material-attached wiring body
24 electrical wire (wire-like transmission member)
26 core wire
28 insulating covering
30 base material
40 140 protection sheet material
80 metal member
82 burr
90 thermal source
P fixing position
D1 first direction
D2 second direction

The invention claimed is:

1. A wiring member, comprising:
a flat wiring body; and
a protection sheet material that covers one main surface of the wiring body and does not cover the other main surface of the wiring body, wherein the protection sheet material is partially fixed to the one main surface of the wiring body in a plurality of positions at intervals and is not fixed to the other main surface of the wiring body, wherein
the protection sheet material and the wiring body can relatively move in a direction connecting a plurality of fixing positions away from each other at an interval.

2. A wiring member, comprising:
a flat wiring body; and
a protection sheet material partially fixed to at least one main surface of the wiring body in a plurality of positions at intervals, wherein
the wiring body includes a sheet-like base material and a plurality of wire-like transmission members disposed on one main surface of the base material, and
the protection sheet material is partially fixed to another main surface of the base material.

3. The wiring member according to claim 1, wherein the protection sheet material has a heat insulation function.

4. The wiring member according to claim 1, wherein
the flat wiring body includes a sheet-like base material and a plurality of wire-like transmission members disposed on a partial area of one main surface of the sheet-like base material, and
the protection sheet material is fixed to the sheet-like base material of the wiring body at the plurality of positions outside the partial area where the plurality of wire-like transmission members are disposed, and is not fixed inside the partial area.

5. The wiring member according to claim 4, wherein
the plurality of wire-like transmission members extend in a first direction and arranged side by side in parallel to each other in a second direction, which is perpendicular to the first direction;
the sheet-like base material is wider than the partial area in the second direction, and
the protection sheet material is fixed to the sheet-like base material at the plurality of positions provided both sides of the plurality of wire-like transmission members in the second direction, and are spaced from each other in the first direction.

6. The wiring member according to claim 1, wherein the protection sheet material is a sheet including a fiber or a foam sheet.

7. The wiring member according to claim 2, wherein
the plurality of wire-like transmission members are disposed on a partial area of the one main surface of the sheet-like base material, and
the protection sheet material is fixed to the other main surface of the sheet-like base material of the wiring body at the plurality of positions outside the partial area where the plurality of wire-like transmission members are disposed, and is not fixed inside the partial area.

8. The wiring member according to claim 7, wherein
the plurality of wire-like transmission members extend in a first direction and arranged side by side in parallel to each other in a second direction, which is perpendicular to the first direction;
the sheet-like base material is wider than the partial area in the second direction, and
the protection sheet material is fixed to the sheet-like base material at the plurality of positions provided both sides of the plurality of wire-like transmission members in the second direction, and are spaced from each other in the first direction.

9. The wiring member according to claim 2, wherein the protection sheet material is a sheet including a fiber or a foam sheet.

* * * * *